United States Patent
Shouno

(10) Patent No.: US 9,444,783 B2
(45) Date of Patent: Sep. 13, 2016

(54) COMMUNICATION APPARATUS AND CONTROL METHOD THEREOF

(75) Inventor: Hiroki Shouno, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1038 days.

(21) Appl. No.: 12/596,126

(22) PCT Filed: Jun. 11, 2008

(86) PCT No.: PCT/JP2008/061080
§ 371 (c)(1),
(2), (4) Date: Oct. 15, 2009

(87) PCT Pub. No.: WO2009/001718
PCT Pub. Date: Dec. 31, 2008

(65) Prior Publication Data
US 2010/0229030 A1 Sep. 9, 2010

(30) Foreign Application Priority Data
Jun. 28, 2007 (JP) .................................. 2007-171222

(51) Int. Cl.
*G06F 9/00* (2006.01)
*H04L 29/12* (2006.01)

(52) U.S. Cl.
CPC ..... *H04L 61/2053* (2013.01); *H04L 29/12273* (2013.01); *H04L 29/12915* (2013.01); *H04L 61/6059* (2013.01)

(58) Field of Classification Search
CPC ........... H04L 61/6059; H04L 61/2053; H04L 6/2503; H04L 61/00; H04L 63/0236; H04L 29/06585

USPC .......................................................... 726/11
See application file for complete search history.

(56) References Cited

U.S. PATENT DOCUMENTS

| | | | |
|---|---|---|---|
| 2002/0016858 A1* | 2/2002 | Sawada et al. ............... | 709/238 |
| 2003/0149891 A1* | 8/2003 | Thomsen ...................... | 713/201 |
| 2003/0217283 A1* | 11/2003 | Hrastar et al. ............... | 713/200 |
| 2005/0050365 A1* | 3/2005 | Seki et al. .................... | 713/201 |
| 2005/0213572 A1* | 9/2005 | Huang et al. ................. | 370/389 |
| 2007/0011725 A1* | 1/2007 | Sahay et al. ...................... | 726/4 |
| 2007/0022477 A1* | 1/2007 | Larson ........................... | 726/15 |
| 2007/0240201 A1* | 10/2007 | Shih et al. ........................ | 726/4 |
| 2008/0219162 A1* | 9/2008 | Akyol .......................... | 370/232 |

FOREIGN PATENT DOCUMENTS

| | | |
|---|---|---|
| JP | 2005-159683 | 6/2005 |
| JP | 2005-339106 | 12/2005 |
| JP | 2006-93910 | 4/2006 |

* cited by examiner

*Primary Examiner* — Esther B Henderson
(74) *Attorney, Agent, or Firm* — Fitzpatrick, Cella, Harper & Scinto

(57) ABSTRACT

A communication apparatus stores a first address in association with a second address of an apparatus which is targeted to permit or restrict processing of a received packet. The communication apparatus detects first and second addresses of a transmission apparatus which is a source of a packet received through a network, and if the detected first address of the transmission apparatus is stored, then the processing of the received packet is permitted or restricted. If the detected first address of the transmission apparatus is not stored in association with the second address of the transmission apparatus and the detected second address is stored, then the communication apparatus updates the stored first address with the detected first address.

9 Claims, 18 Drawing Sheets

F I G. 2
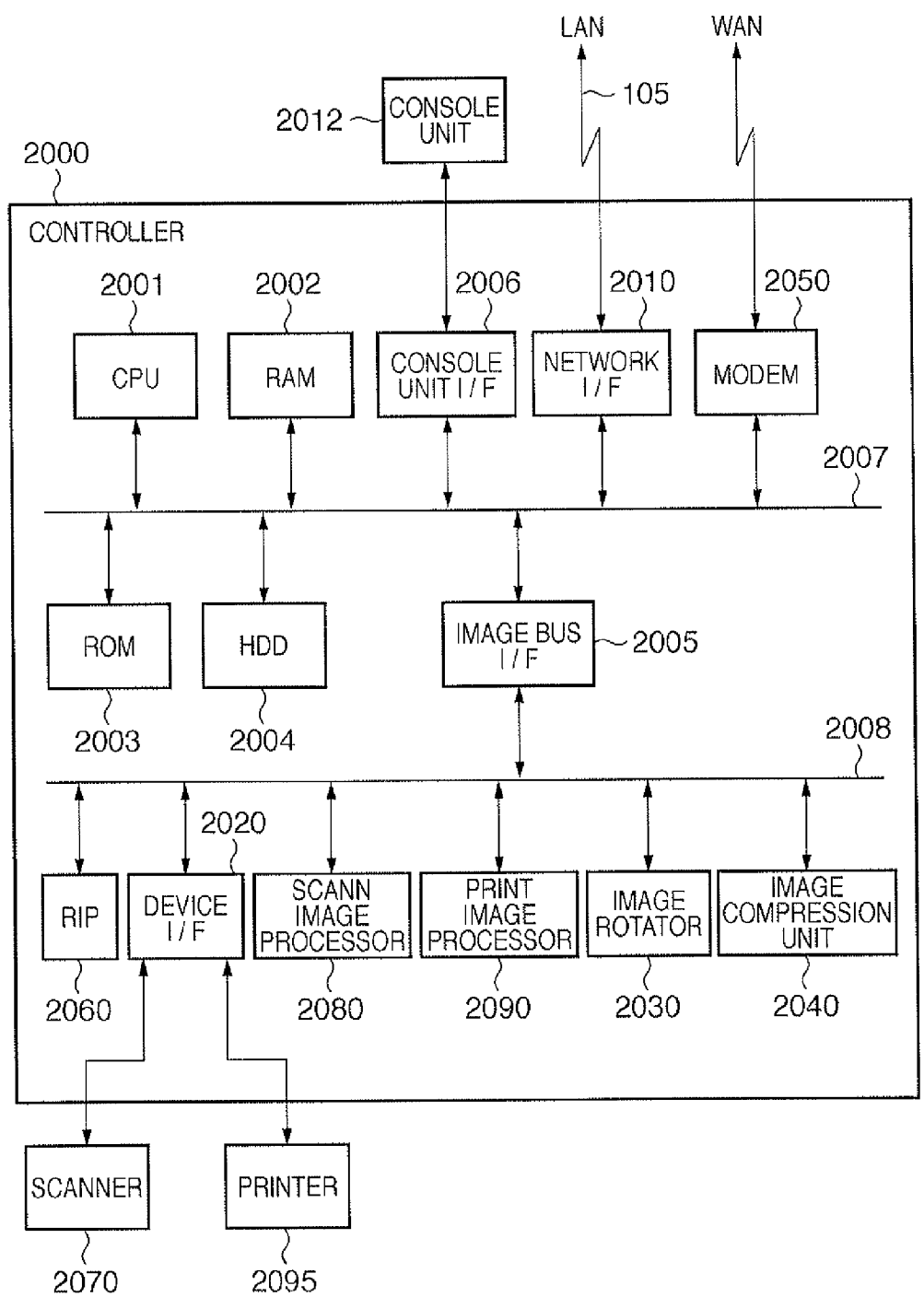

FIG. 10

| 10001 | 10002 | 10003 |
|---|---|---|
| 1000::1 | AA:BB:CC:DD:EE:FF | |
| 1000::100 | | Yamada-pc.aaaa.co.jp |
| 1000::200 | 12:34:56:78:90:AB | |
| 1000::101 | 11:11:22:22:33:33 | |
| 1000::FFFF | | Suzuki.aaaa.co.jp |
| | | |
| | | |
| | | |
| | | |

FIG. 17

| 17001 | 17002 | 17003 |
|---|---|---|
| 192.168.0.10 | AA:BB:CC:DD:EE:FF | |
| 192.168.0.20 | | sasaki-pc.aaaa.co.jp |
| 192.168.0.100 | 12:34:56:78:90:AB | |
| 192.168.0.150 | 11:11:22:22:33:33 | |
| 192.168.0.95 | | KanriPC.aaaa.co.jp |
| 192.168.0.210 | | tanaka.aaaa.co.jp |
| | | |
| | | |
| | | |

COMMUNICATION APPARATUS AND CONTROL METHOD THEREOF

This application is a National Stage application under 35 U.S.C. §371 of International Application No. PCT/JP2008/061080, filed on Jun. 11, 2008, which claims priority to Japanese Application No. 2007-171222, filed on Jun. 28, 2007, the contents of each of the foregoing applications being incorporated by reference herein.

TECHNICAL FIELD

The present invention relates to a communication apparatus comprising a network communication function and a control method of said apparatus, and more particularly, to a packet filtering technique.

BACKGROUND ART

Network address filtering is a general technique for restricting, on a node level, a communication attempt from a node used by a malicious user. This technique is purposed to block a packet having a particular network address by using a protocol stack or a higher-layer application program. Targeted network addresses are mainly the Internet Protocol version 4 (IPv4) and Internet Protocol version 6 (IPv6) addresses. A user can explicitly select a target communication partner by registering in the user's device a network address of a node to which communication is to be permitted or restricted. There are other methods, such as registering a range of addresses to which communication is to be permitted or restricted, or registering a designated subnet or prefix (see Japanese Patent Application Laid-Open (KOKAI) No. 2006-093910).

However, if the network address of the node is changed, the registered filtering-target address must also be changed. This leads to an increased work of users and device administrators. Among IPv6 addresses, there is a type that changes its address value in a short period of time. An IPv6 anonymous address defined by the RFC 3041 has a characteristic in that an IPv6 address is automatically generated, and after an elapse of a predetermined time period, another IPv6 address is automatically generated and the previous IPv6 address is no longer used. In other words, if the filtering-target node has an IPv6 anonymous address, the registered content of the filtering target must constantly be updated, hampering the user's convenience. To generate an IPv6 anonymous address, a router first distributes prefix information to a node on a network. The node which has received the prefix information generates its own IPv6 address by combining the prefix information with a random-formed interface identifier. Further, the prefix information distributed by the router has lifetime information. The node starts timing from the address generation, and when the lifetime elapses, the use of the IPv6 address is disabled. In this case, the node again generates an IPv6 address from the prefix information and random-formed interface identifier. In general, the lifetime is often from few hours to few days. Therefore, the IPv6 address of the node is also changed within few hours to few days. Even if the IPv6 address is registered in the IPv6 address filter, a frequent setting change is needed.

In the IPv4, a similar problem also occurs when using, e.g., Dynamic Host Configuration Protocol (DHCP). In this case, a DHCP server distributes an IPv4 address. However, depending on the DHCP server setting, the distributing IPv4 address varies each time, and as a result the IPv4 address value of the node may change in a short period.

In such environment where a network address changes, Mac address filtering may be used as alternative means. The Mac address filtering is a technique of filtering a Media Access Control (Mac) address of a device. The Mac address is a device-unique address and is never changed. Therefore, once the address is set, filtering can be performed permanently unless the device is replaced. However, Mac address information in a network frame is an address of the device which has transmitted the frame. Therefore, when communication is performed through a router, the Mac address in the frame is the address of the router, and the Mac address of the node which has transmitted the frame is not included. In other words, in the network environment having a router, Mac address filtering cannot be used as alternative means, and the fundamental problem solution has not yet been provided.

DISCLOSURE OF INVENTION

The object of the present invention is to eliminate the above-mentioned conventional problems.

According to the present invention, this invention saves user's troublesome operation of filter information update by automatically updating information regarding a network address of an apparatus which is targeted to permission or restriction, or according to the present invention, even in a network environment where a network address changes in a short period of time, this invention provides a technique that can perform reliable filtering and permit or restrict processing on received data.

According to an aspect of the present invention, there is provided a communication apparatus for performing communication through a network, comprising:

a storage unit configured to store a first address in association with a second address, the first address being an address in a network layer of an apparatus which is targeted to permit or restrict processing of a received packet, and the second address being an address in a layer different from the network layer of the apparatus;

a detection unit configured to detect first and second addresses of a transmission apparatus which is a source of a packet received through the network;

a filtering unit configured to permit or restrict processing of the received packet in a case where the first address of the transmission apparatus detected by the detection unit is stored in the storage unit; and an update unit configured to, in a case where the first address of the transmission apparatus detected by the detection unit is not stored in the storage unit in association with the second address of the transmission apparatus detected by the detection unit and the second address of the transmission apparatus is stored in the storage unit, update a first address stored in the storage unit in association with the second address of the transmission apparatus to the first address detected by the detection unit.

According to an aspect of the present invention, there is provided a control method of a communication apparatus which performs communication through a network, comprising the steps of:

storing in a memory a first address in association with a second address, the first address being an address in a network layer of an apparatus which is targeted to permit or restrict processing of a received packet, and the second address being an address in a layer different from the network layer of the apparatus;

detecting first and second addresses of a transmission apparatus which is a source of a packet received through the network;

in a case where the first address of the transmission apparatus detected in the detection step is stored in the memory, filtering to permit or restrict processing of the received packet; and in a case where the first address of the transmission apparatus detected in the detection step is not stored in the memory in association with the second address of the transmission apparatus detected in the detection step and the second address of the transmission apparatus is stored in the memory, updating a first address stored in the memory in association with the second address of the transmission apparatus to the first address of the transmission apparatus detected in the detection step.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 2 is a block diagram showing a configuration of a main unit of a (multifunction peripheral) MFP according to the embodiment;

FIG. 10 depicts a view describing an example of a filter table according to the first embodiment;

FIG. 17 depicts a view illustrating an example of a filter table according to the second embodiment.

BEST MODE FOR CARRYING OUT THE INVENTION

Preferred embodiments of the present invention will now be described in detail with reference to the accompanying drawings. The following embodiments are not intended to limit the claims of the present invention.

Figure 1:
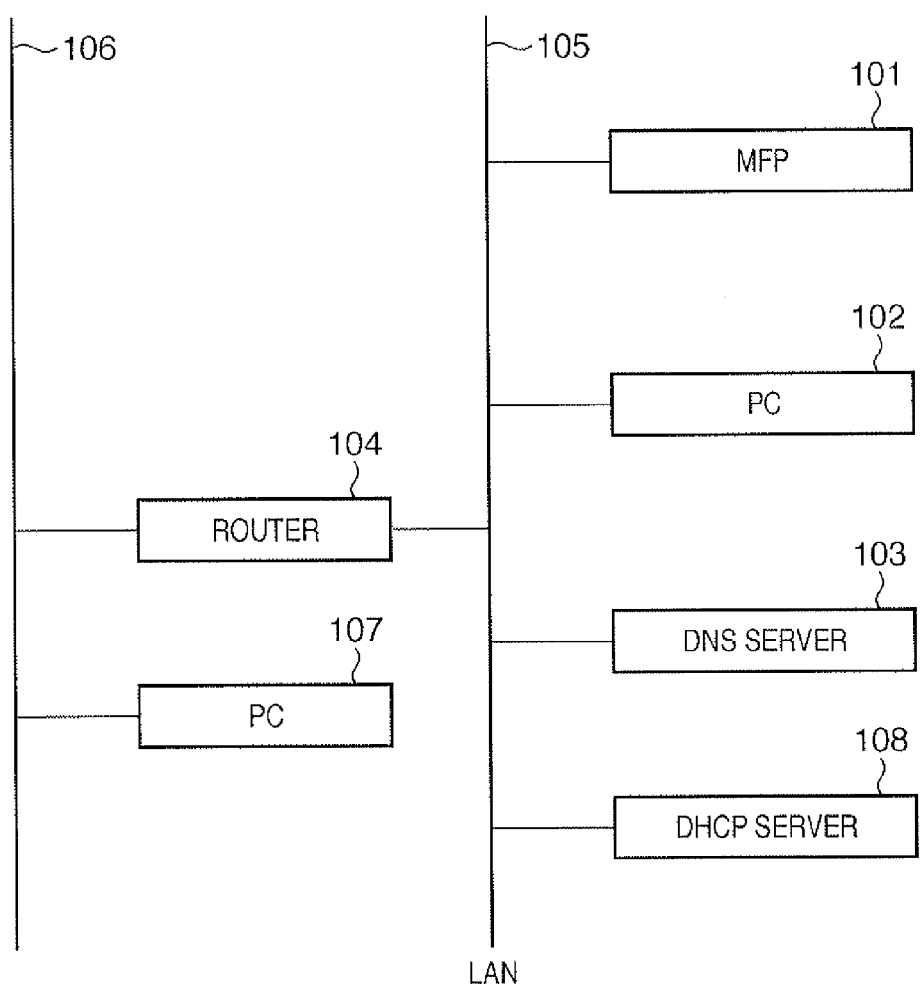
FIG. 1 is a diagram explaining a system configuration according to an exemplary embodiment of the present invention.

First described with reference to FIG. 1 is the configuration of a system in which an image forming apparatus assumed by an exemplary embodiment of the present invention is operating. Although this embodiment describes, as an example, an operation executed by a multifunction peripheral (MFP) having image forming and communication functions, the present invention is not limited to this and can be applied to a communication apparatus. A communication apparatus includes image forming apparatuses such as MFP, and general information processing apparatuses such as PC.

FIG. 1 is an explanatory diagram of a network system configuration according to the present embodiment.

The network in the user environment is a LAN 105. Assume herein that an Ethernet (registered trademark) is used. A node having a plurality of network interfaces that will be described below is connected to the LAN 105. A MFP 101 is the image forming apparatus according to the present embodiment. Assume herein that it is a multifunction peripheral (MFP) having scanner, printer, and FAX functions.

A PC 102 is a general-purpose personal computer. The PC 102 comprises a CPU as a processing unit, and RAM, ROM, and HDD as storage units. The PC 102 also comprises a CD-ROM drive as an external storage unit. The PC 102 further comprises Network Interface Card (NIC) and Universal Serial Bus (USB) host interface as external interface units. Peripheral devices connected to the PC 102 include a pointing device, display, keyboard and the like. The main functions of software incorporated in the PC 102 include OS, office software such as word processor and spreadsheet software, electronic mail client software, and the like. The OS has a port monitor as one of its functions for transmitting print data to printers or the MFP 101 through a network. Furthermore, the PC 102 is capable of communication in accordance with the IPv6 and IPv4. The PC 102 is capable of receiving a Router Advertisement (RA) packet from a router as an IPv6 address and generating an IPv6 anonymous address.

A DNS server 103 is capable of DNS communication in accordance with the IPv6. A name table of the server not only comprises A record but also AAAA record, so that the server 103 can have information on IPv6 addresses and host names associated with each other. A router 104 can route packets through the LAN 105 and LAN 106. It can route packets in accordance with the IPv4 and IPv6 protocols. Also, the router 104 periodically transmits a RA packet to the LAN 105 and LAN 106. The LAN 106 is an Ethernet. A DHCP server 108 executes automatic IP address allocation in accordance with the IPv4. A PC 107 connected to the LAN 106 has the same structure as that of the PC 102.

FIG. 2 is a block diagram showing a configuration of the main unit of the MFP 101 according to the present embodiment. Mainly shown herein is a configuration of a controller 2000 of the MFP 101.

The controller 2000 is connected with a scanner 2070 serving as an image input device, and a printer 2095 serving as an image output device. The controller 2000 can realize copying by reading image data with the scanner 2070 and printing the image with the printer 2095. Further, by being connected with the LAN 105, the controller 2000 can input or output image information and device information through the network. The controller 2000, comprising a CPU 2001, starts up an operating system (OS) by a boot program stored in ROM 2003. While the OS is operating, the controller 2000 executes an application program stored in a hard disk drive (HDD) 2004, thereby executing various controls. RAM 2002 is used as a working area of the CPU 2001. The RAM 2002 provides, in addition to the working area, an image memory area for temporarily storing image data. The HDD 2004 stores image data as well as the above-described application program.

Connected to the CPU 2001 through a system bus 2007 are: a console unit interface (I/F) 2006, a network I/F 2010, MODEM 2050, and an image bus I/F 2005. The console unit I/F 2006 is an interface for a console unit 2012 having a touch panel, and outputs image data to be displayed to the console unit 2012. Also, the console unit I/F 2006 outputs information, which is inputted by a user on the console unit 2012, to the CPU 2001. The network I/F 2010, which is connected to the LAN 105, performs information input and output through the LAN 105 between various devices connected to the LAN 105. The MODEM 2050, which is connected to a wide area network (WAN), performs information input and output. The image bus I/F, 2005, which connects the system bus 2007 with an image bus 2008 that transfers image data at high speed, serves as a bus bridge for converting a data structure.

The image bus 2008 is configured with a PCI bus or IEEE 1394. Connected to the image bus 2008 are: a raster image processor (RIP) 2060, a device I/F 2020, a scan image processor 2080, a print image processor 2090, an image rotator 2030, and an image compression/decompression unit 2040. The RIP 2060 develops PDL codes into bitmap image data. The device I/F 2020, to which the scanner 2070 and printer 2095 are connected, performs conversion on image data in synchronous and asynchronous modes. The scan image processor 2080 performs correction, editing, and manipulation on inputted image data. The print image processor 2090 performs correction and resolution conversion or the like on the image data to be outputted to the printer 2095. The image rotator 2030 performs rotation on image data. The image compression/decompression unit 2040 performs compression of multi-valued image data to JPEG data, or performs compression on binary image data in a compression method such as JBIG, MMR, MH and the like, and also perform decompression.

Figure 3:
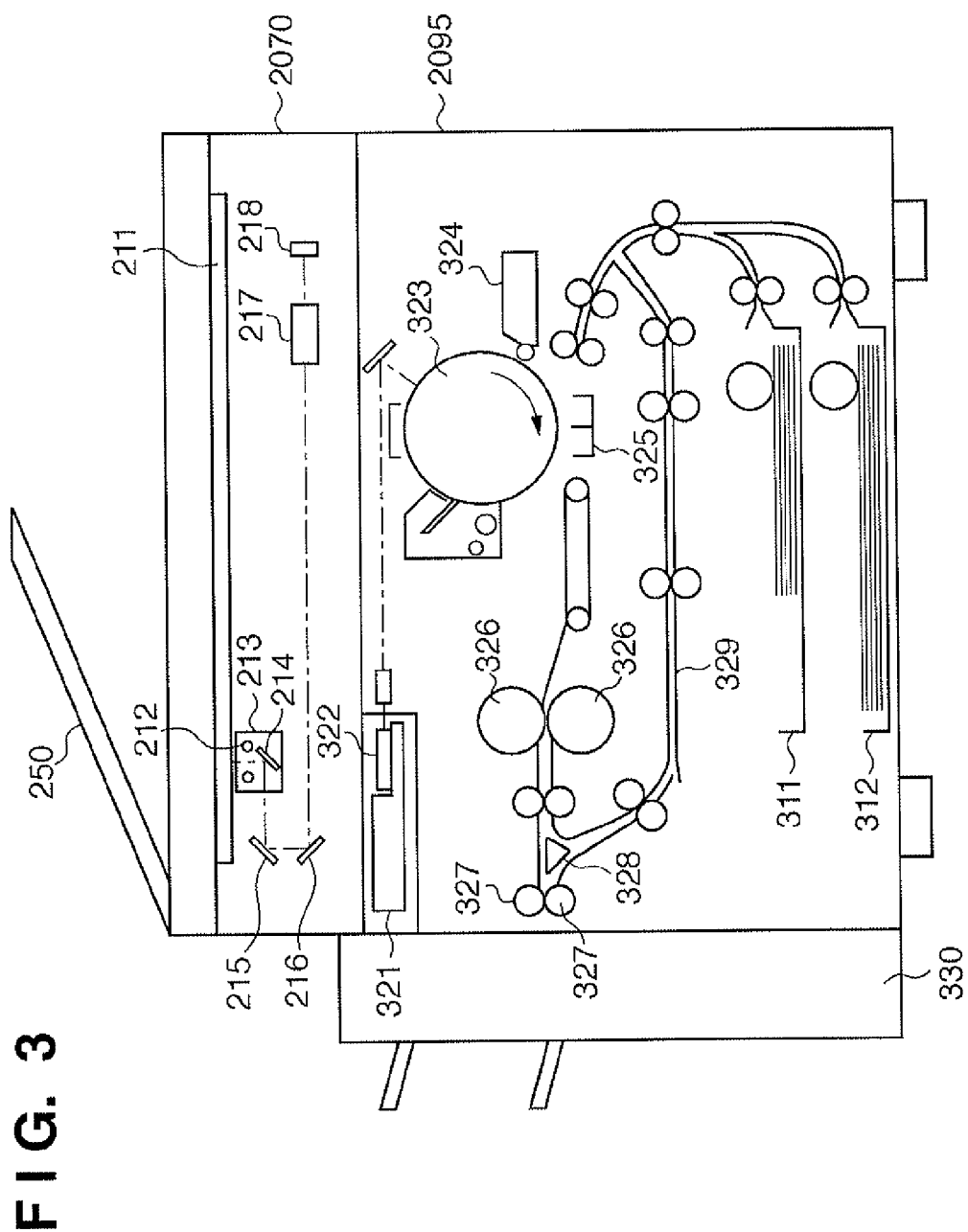
FIG. 3 is a schematic diagram showing a hardware configuration of a scanner and a printer of the MFP according to the embodiment.

FIG. 3 is a schematic diagram showing a hardware configuration of the scanner 2070 and printer 2095 of the MFP 101 according to the present embodiment.

The scanner 2070 and printer 2095 are integrally constructed as shown in FIG. 3. The scanner 2070 has a document feed unit 250, which feeds a document at the time to a platen glass 211. Each time the reading operation of the document is completed, the document is discharged to a discharge tray (not shown) from the platen glass 211. When the document is fed to the platen glass 211, the scanner 2070 turns on a lamp 212 and starts motion of a moving unit 213.

By the motion of the moving unit 213, the document on the platen glass 211 is scanned. During the scanning, reflection light from the document is led to a CCD image sensor (CCD) 218 through each of the mirrors 214, 215 and 216 and a lens 217, then the image on the document is formed on the image sensing surface of the CCD 218. The CCD 218 converts the image formed on the image sensing surface to electric signals, and the electric signals are subjected to predetermined processing, then supplied to the controller 2000 in FIG. 2.

The printer 2095 has a laser driver 321, which drives a laser 322 based on image data inputted by the controller 2000. By driving the laser 322, a laser beam corresponding to the image data is emitted from the laser 322, and the laser beam is scanned and irradiated on a photosensitive drum 323. This laser beam forms an electrostatic latent image on the photosensitive drum 323, and the electrostatic latent image is visualized into a toner image by toner supplied from a developer 324. In synchronization with the laser beam irradiation timing, a sheet is fed from one of the sheet cassettes 311 and 312 to a position between the photosensitive drum 323 and transfer unit 325 through a conveyance path. Then, the toner image on the photosensitive drum 323 is transferred onto the sheet by the transfer unit 325.

The sheet on which the toner image is transferred is sent to a pair of fixing rollers (heat roller and pressurize roller) 326 through a conveyance belt. The pair of fixing rollers 326 pressurize the sheet with heat and fix the toner image on the sheet. The sheet which has gone through the pair of fixing rollers 326 is discharged to a discharge unit 330 by a pair of discharge rollers 327. The discharge unit 330 has a sheet processing device capable of post processing such as sorting and stapling. In a case where a double-side printing mode is set, the rotation direction of the pair of discharge rollers 327 is reversed after the sheet is conveyed to the pair of discharge rollers 327, and the sheet is led to a paper re-feeding path 329 by a flapper 328. The printing paper, which has been led to the paper re-feeding path 329, is again fed to the position between the photosensitive drum 323 and transfer unit 325 at the above-described timing, and the toner image is transferred onto the back surface of the sheet.

Next, a configuration of the console unit 2012 is described.

Figure 4:
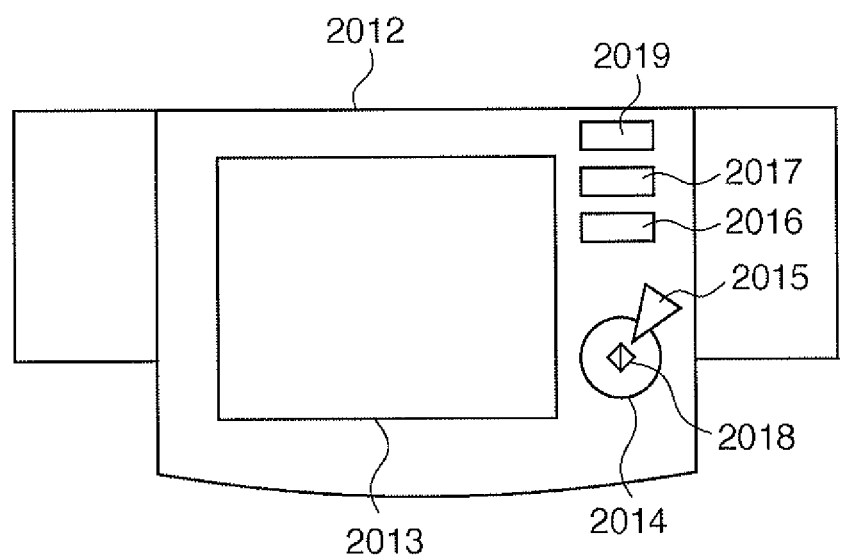
FIG. 4 depicts a view illustrating an external appearance of a console unit of the MFP according to the embodiment.

FIG. 4 depicts a view illustrating an external appearance of the console unit 2012 of the MFP 101 according to the present embodiment.

A display unit 2013 is configured with a LCD on which a touch panel sheet is provided. The display unit 2013 displays an operation screen and transmits position information of a depressed key to the CPU 2001 when a displayed key is depressed. A start key 2014 is used to start a document image reading operation. In the center of the start key 2014, green and red LEDs 2018 are provided to indicate, by the color of the LED, whether the start key 2014 is in a ready-to-use state. A stop key 2015 is used to stop an operation in progress. An ID key 2016 is used to input a user ID. A reset key 2017 is used to initialize setting made by the console unit 2012. A mode setting key 2019 is depressed to designate a mode for performing various setting on the MFP 101.

Figure 5:
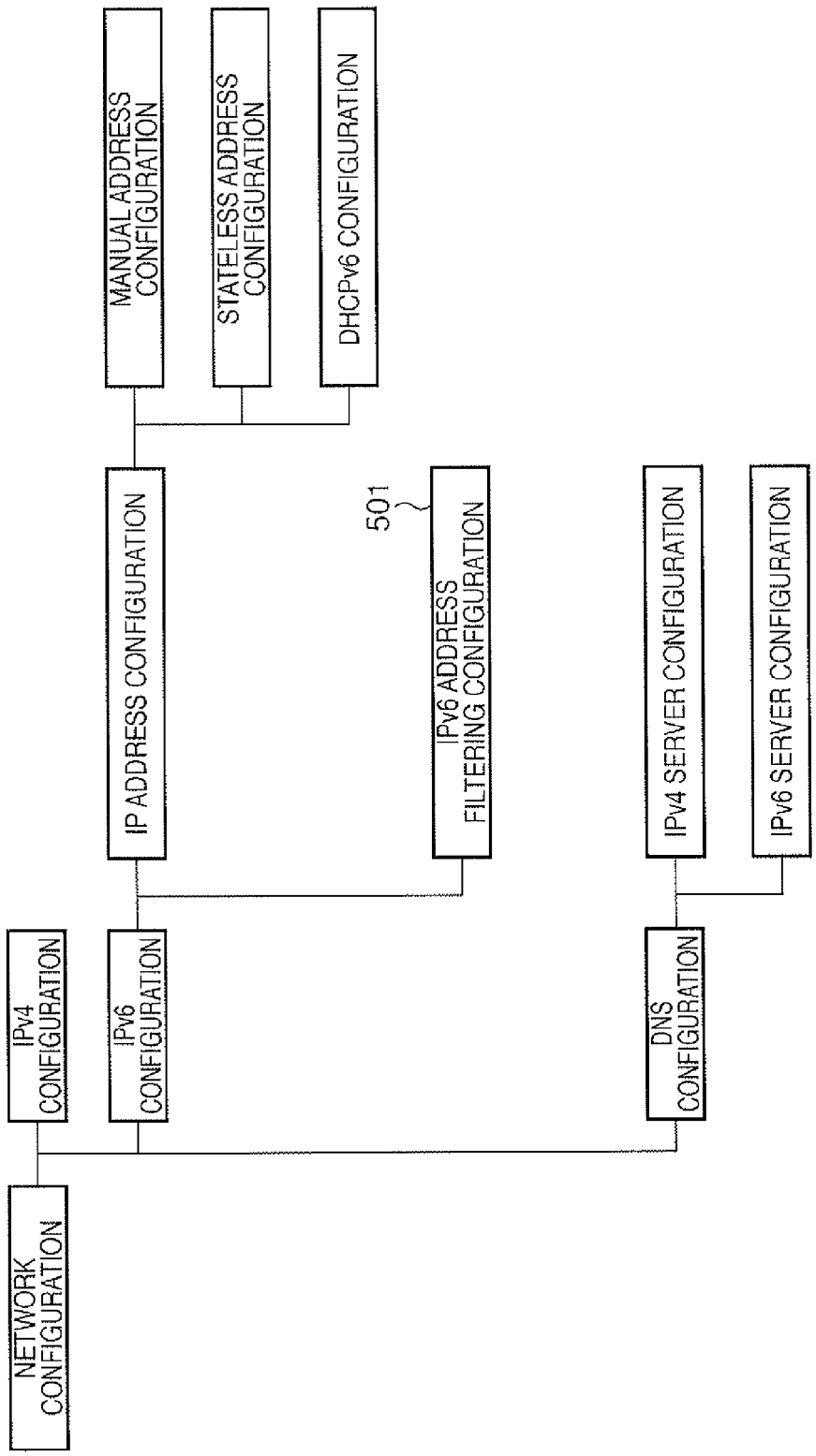
FIG. 5 is a diagram showing, as an example, a tree structure of a network configuration which is displayed on a display unit when a mode setting key is depressed.

FIG. 5 shows, as an example, a tree structure of a network configuration which is displayed on the display unit 2013 when the mode setting key 2019 is depressed on the MFP 101 according to the present embodiment.

Assume that the HDD 2004 stores a program for setting a network configuration of the MFP 101. When the mode setting key 2019 is depressed, a menu for performing various setting on the MFP 101 is displayed on the display unit 2013 of the console unit 2012. When "Network Configuration" is selected, a setting menu related to the network configuration is displayed. The menu related to the network configuration has a tree structure indicative of network layers. For instance, "IPv6 Address Filtering Configuration" 501, which is a function for restricting processing of a packet transmitted from a particular IPv6 address, is positioned on a network layer shown in FIG. 5. That is, from the upper layer, it can be expressed as follows: "Network Configuration"-"IPv6 Configuration"-"IPv6 Address Filtering Configuration".

By touching a cursor key (not shown) displayed on the display unit 2013, a user of the MFP 101 can move the displayed tree upward, downward, right, or left to display and operate the desired setting menu.

Figure 6:
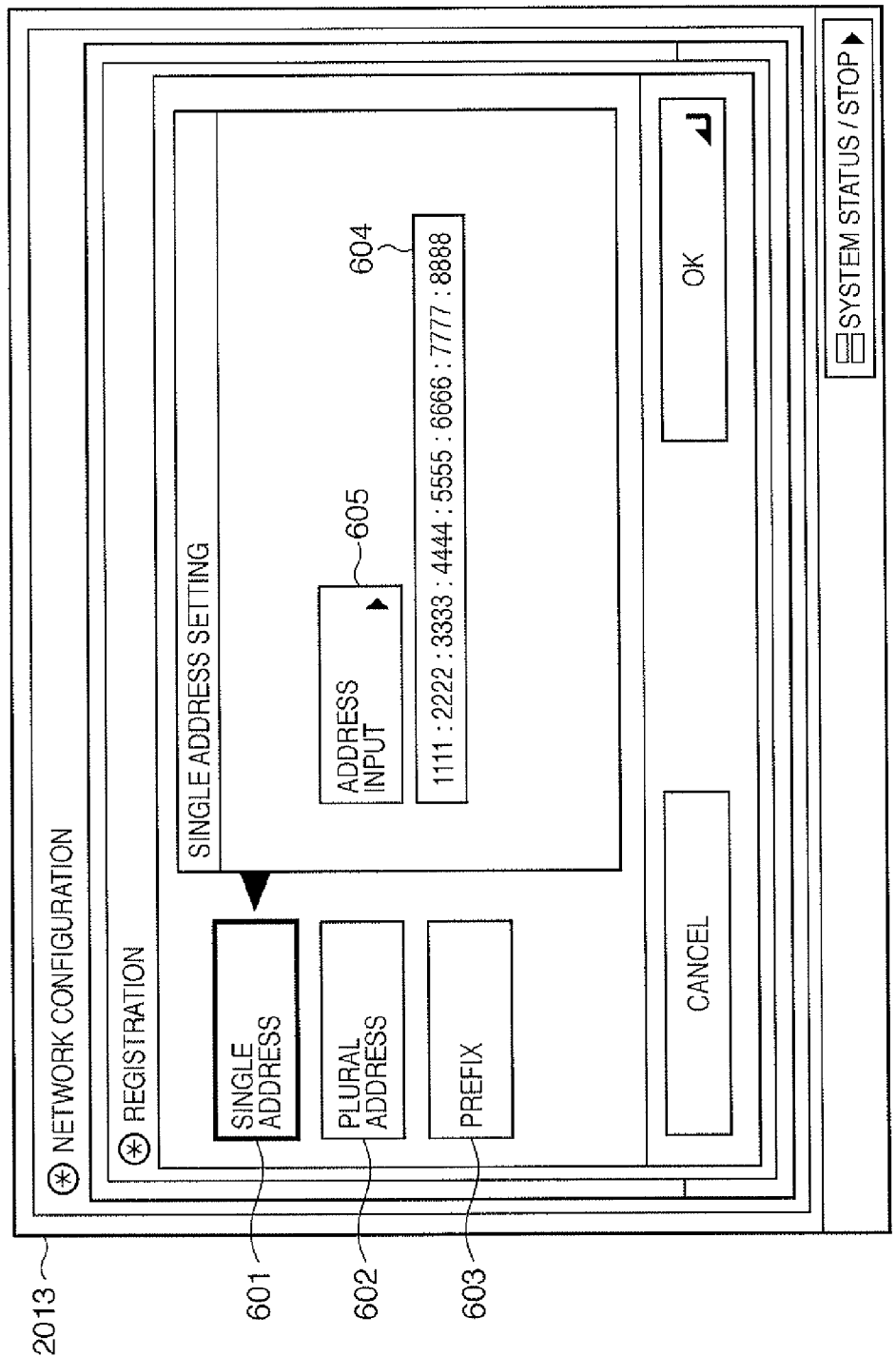
FIG. 6 depicts a view illustrating a display example of a screen for setting an IPv6 address filtering.

FIG. 6 depicts a view illustrating an example of a screen for setting the IPv6 address filtering.

A key ("Single Address") 601 is a touch key for branching to the screen to input a single IPv6 address targeted to restriction. When an operator of the MFP 101 depresses the key 601, a window appears to display a key ("Address Input") 605 and a display form 604. When the operator depresses the key 605, a configuration UI (not shown) for inputting an IPv6 address is displayed. The operator can input an IPv6 address using the configuration UI. The IPv6 address inputted by the operator is displayed on the display form 604.

A key ("Plural Addresses") 602 is a touch key for branching to a configuration UI for designating a range of IPv6 addresses.

Figure 7:
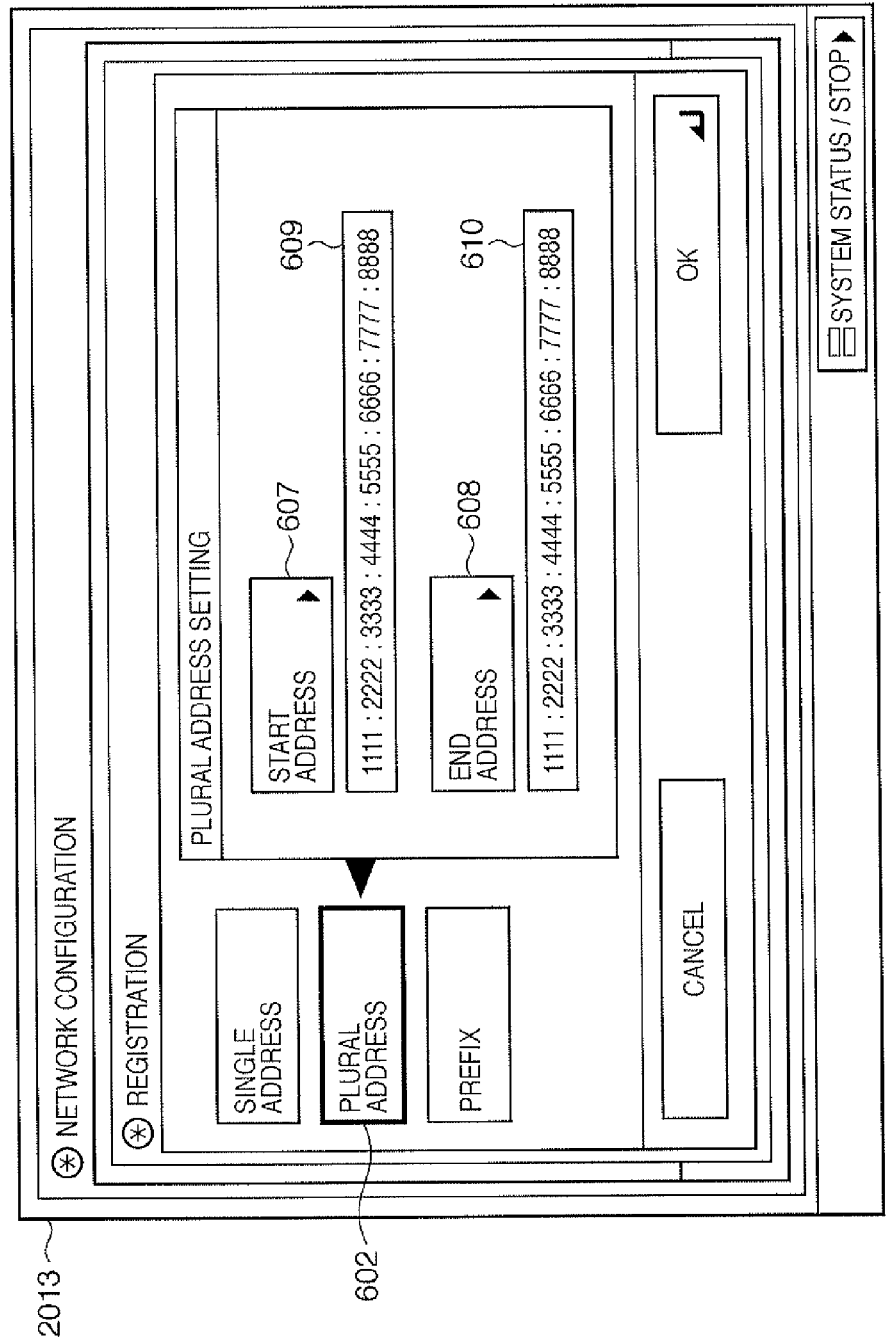
FIG. 7 depicts a view illustrating a display example of a display unit when a "plural addresses" key is depressed.

FIG. 7 depicts a view illustrating a display example of the display unit 2013 when the key 602 is depressed.

On this screen, an IPv6 address can be designated in a range from a start address to an end address. When a key (Start Address) 607 is depressed, a start address of the IPv6 address can be inputted. When a key (End Address) 608 is depressed, an end address of the IPv6 address can be inputted. Boxes 609 and 610 respectively show examples of the start and end addresses.

Figure 8:
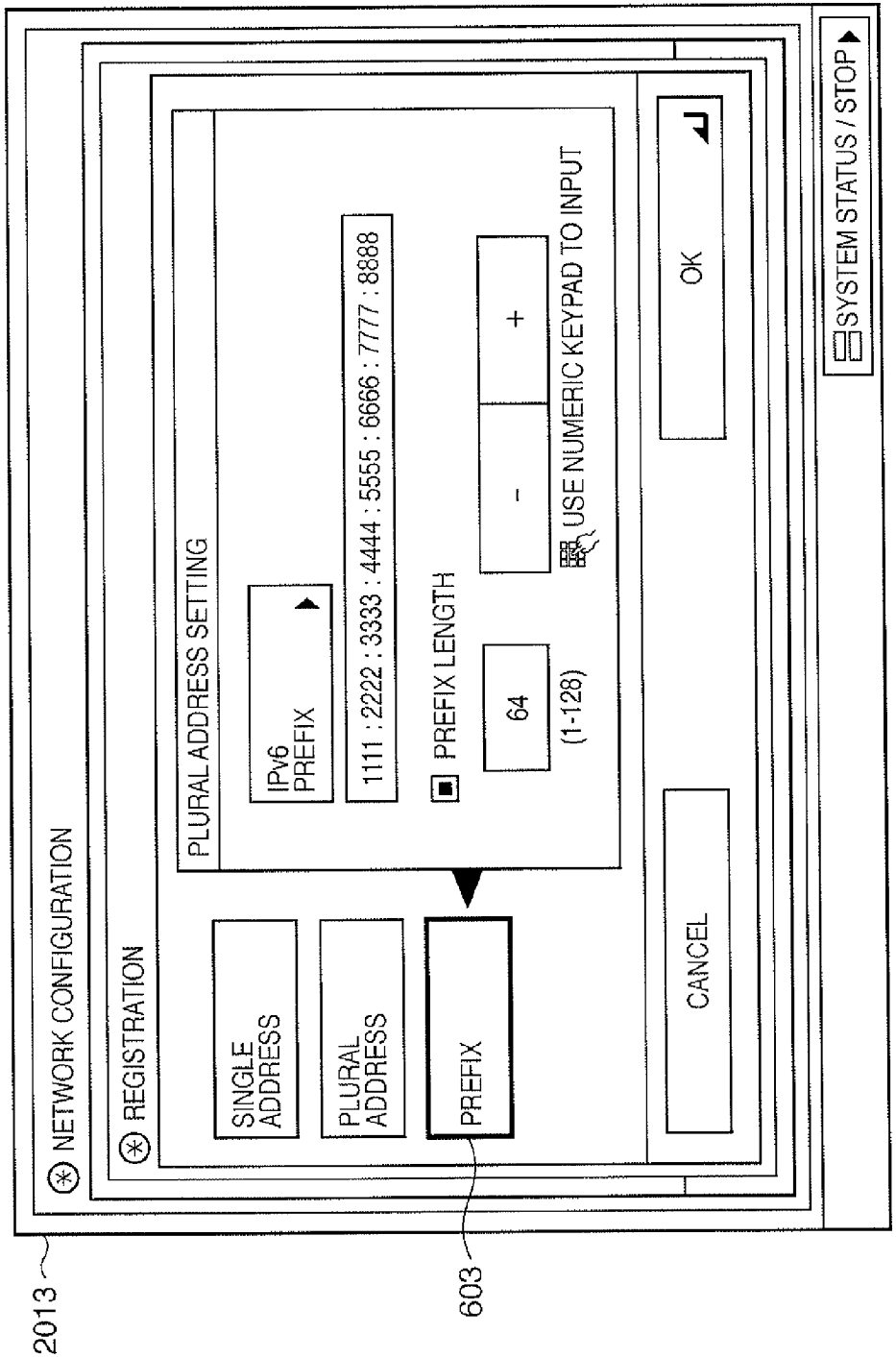
FIG. 8 depicts a view illustrating an example of a configuration UI for designating IPv6 addresses in units of prefix.
Figure 9:
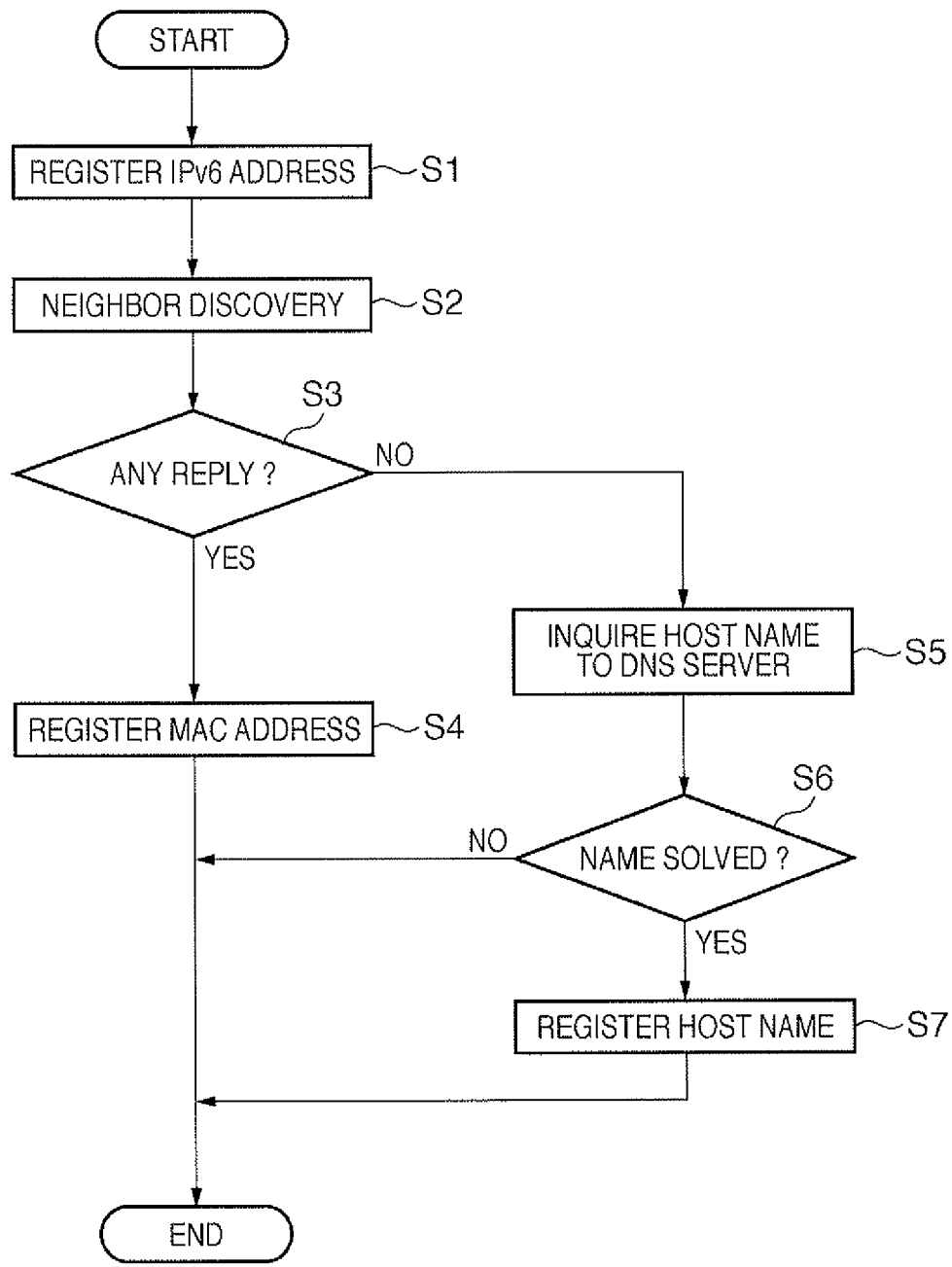
FIG. 9 is a flowchart describing a filter table registration sequence in a case where an IPv6 address which is targeted to IPv6 filtering is inputted.

FIG. 8 depicts a view illustrating an example of a configuration UI for designating IPv6 addresses in units of prefix. This screen is displayed when a key (Prefix) 603 (FIG. 6) is depressed;

FIG. 9 is a flowchart describing a filter table registration sequence in a case where an IPv6 address which is targeted to IPv6 filtering is inputted. The filter table is a list of IPv6 addresses of which processing by the MFP 101 should be restricted, and stores a Mac address and a host name in pairs. The filter table is generated in the RAM 2002 and stored in the HDD 2004.

FIG. 10 depicts a view illustrating an example of the filter table according to the first embodiment.

The IPv6 address inputted by an operator of the MFP 101 is stored in the column 10001. Each MAC address (hardware address) of a node having an IPv6 address is stored in the column 10002 of the corresponding IPv6 address row. Further, a host name of a node having the IPv6 address is stored in the column 10003 of the corresponding IPv6 address row. By referring to the table, an IPv6 address, a MAC address, and a host name can be associated with each other. In the example of FIG. 10, although an IPv6 address, a MAC address, and a host name are stored in association with each other, for instance, the host name can be omitted. In this case, host name registration and search processing based on the host name can be omitted in the flowcharts shown in FIGS. 11 and 13.

Next, filter table registration control is described with reference to the flowchart in FIG. 9. A program executing this control is stored in the ROM 2003 and is executed under the control of the CPU 2001.

In step S1, when an operator of the MFP 101 inputs an IPv6 address, the IPv6 address is stored in the filter table. In step S2, a Mac address of the node having the IPv6 address inputted in step S1 is confirmed. More specifically, the MFP 101 transmits a neighbor solicitation message according to the Internet Control Message Protocol version 6 (ICMPv6) to the LAN 105. If a node having the IPv6 address inputted by the operator exists in the LAN 105, the node sends back a neighbor advertisement message according to the ICMPv6 as a response to the MFP 101. In step S3, the CPU 2001 determines whether or not a neighbor advertisement message has been received. If a response is received, the control proceeds to step S4 and a Mac address of the node having the IPv6 address inputted by the operator is stored in the filter table. In this manner, the MFP 101 can acquire a Mac address value included in the neighbor advertisement message packet and register the Mac address in the column 10002 of the corresponding IPv6 address.

If a neighbor advertisement message is not received in step S3, the control proceeds to step S5 and a host name corresponding to the inputted IPv6 address is inquired to the DNS server 103. Here, the CPU 2001 makes a reverse lookup request of AAAA record to the DNS server 103, thereby acquiring a host name corresponding to the inputted IPv6 address. In step S6, it is determined whether or not a corresponding host name has been acquired as a result of the inquiry to the DNS server 103. If it is determined that a host name has been acquired (address solved), the control proceeds to step S7, and the host name received from the DNS server 103 is registered in the filter table. In this manner, the CPU 2001 can register the host name in the filter table position corresponding to the inputted IPv6 address.

Meanwhile, if the host name acquisition fails in step S6, the table registration control is cancelled. Herein, the host name acquisition failure includes a case where an error code is returned from the DNS server 103, a case where communication with the DNS server 103 cannot be performed, or a case where registration of the DNS server 103 has not been completed in the MFP 101.

Figure 11:
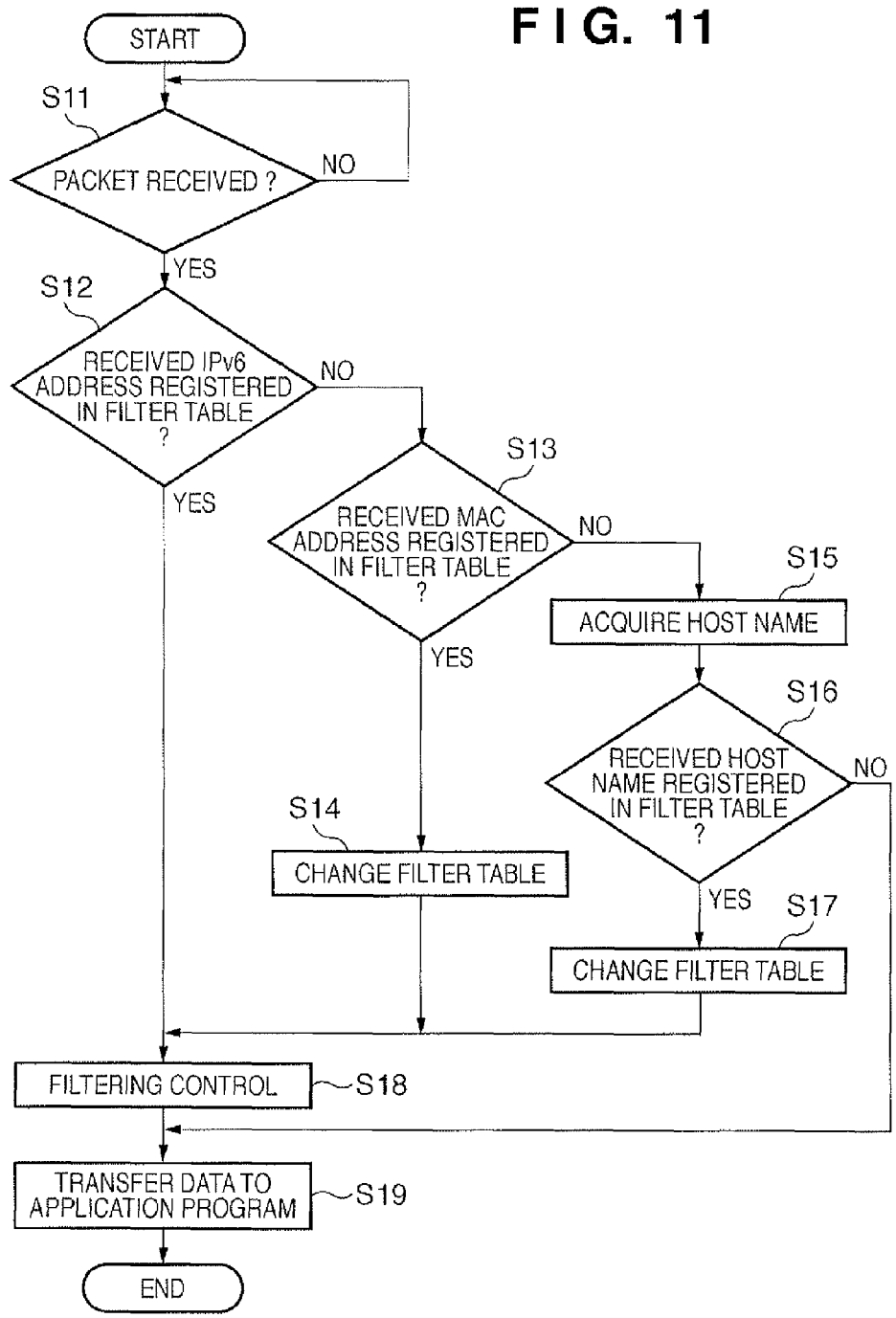
FIG. 11 is a flowchart describing a filtering control in a case where the MFP according to the first embodiment receives a packet.

FIG. 11 is a flowchart describing a filtering control in a case where the MFP 101 receives a packet after the above-described filter table is generated. A program executing this control is stored in the ROM 2003 and is executed under the control of the CPU 2001.

In step S11, the MFP 101 waits for reception of an IPv6 packet. Since the MFP 101 has a print server function and a device management protocol such as a simple network management protocol (SNMP) agent, it receives various packets. When an IPv6 packet is received in step S11, the control proceeds to step S12 where the CPU 2001 confirms a source's IPv6 address of the received packet, and determines whether or not the source's IPv6 address is registered in the filter table. If the source's IPv6 address is registered in the filter table, the control proceeds to step S18 where filtering control is performed so as not to receive the packet.

If the source's IPv6 address is not registered in the filter table in step S12, the control proceeds to step S13 to determine whether or not an address that matches the source's Mac address of the received packet is registered in the filter table. If it is registered, the control proceeds to step S14 where the CPU 2001 changes the value of the IPv6 address, which is corresponding to the Mac address registered in the filter table, to the source's IPv6 address of the received packet. Then, the control proceeds to step S18. Note that this situation in which the source's Mac address is registered in the filter table signifies that the IPv6 address of the filtering target node has been changed after the IPv6 address was once registered as a filtering target in the MFP 101 by an operator.

Figure 12:
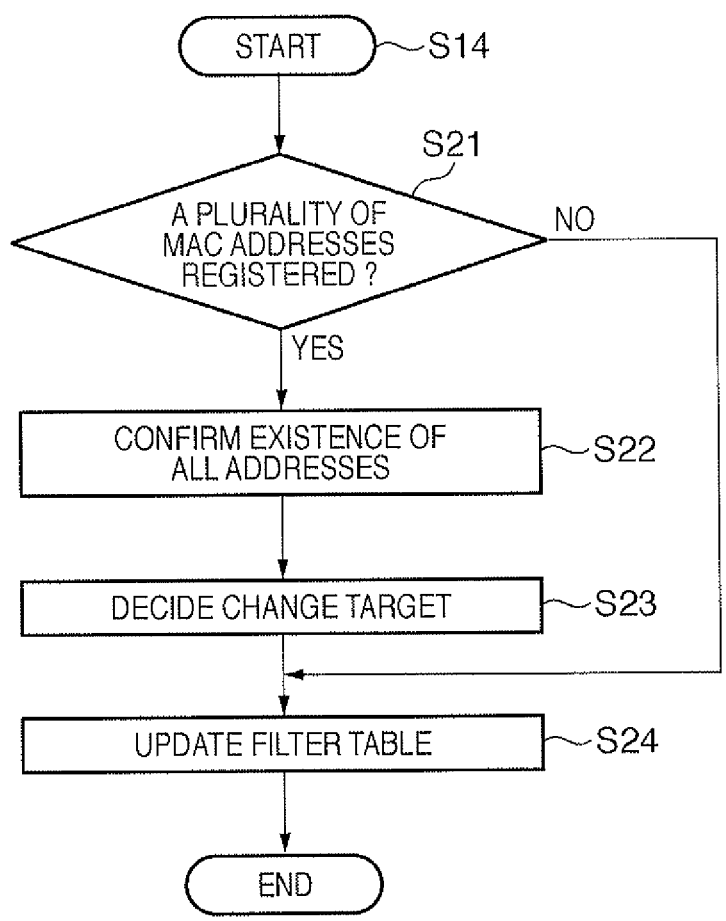
FIG. 12 is a flowchart describing a filter table changing control in step S14 in FIG. 11.

FIG. 12 is a flowchart describing the filter table changing control in step S14.

In step S21, the CPU 2001 determines whether or not a plurality of the received packet's MAC addresses are stored in the filter table. If a plurality of MAC addresses are stored in the filter table, the control proceeds to step S22 where an existence is confirmed with respect to the nodes corresponding to the registered MAC addresses. More specifically, an existence is confirmed by using a neighbor discovery message according to the ICMPv6 with respect to all the IPv6 addresses in the filter table which are corresponding to the received packet's MAC address. In step S23, a registration item to be targeted to a filter table change is determined. Herein, an IPv6 address of which existence is not confirmed as a result of existence confirmation in step S22 is determined as a change target. In step S24, among the IPv6 addresses registered in the filter table, an IPv6 address which is corresponding to the received Mac address and of which existence cannot be confirmed is changed to the source's IPv6 address of the received packet.

The series of control in FIG. 12 takes into consideration of the characteristic that a plurality of IPv6 addresses can be allocated to one node or one network interface. In this case, the filter table may include a plurality of IPv6 addresses corresponding to one same Mac address. Therefore, in order to identify a changed address value among the plurality of IPv6 addresses, an existence of each IPv6 address is confirmed, and then a non-existing IPv6 address is determined to be a changed address.

Referring back to FIG. 11, if it is determined in step S13 that the source's Mac address is not registered in the filter table, the control proceeds to step S15 where the host name of the received packet is acquired. The CPU 2001 makes a reverse lookup request of AAAA record to the DNS server 103, thereby inquiring a host name corresponding to the source's IPv6 address of the received packet. In step S16, it is determined whether or not the host name acquired from the DNS server 103 matches any of the host names registered in the filter table. If a match is found to determine that the acquired host name is registered in the filter table, the control proceeds to step S17; otherwise, the control proceeds to step S19. Note that this situation in which the acquired host name is registered in the filter table (YES in step S16) signifies that the IPv6 address of the filtering target node has been changed after the IPv6 address was once registered as a filtering target in the MFP 101 by an operator. In step S17, the MFP 101 changes the value of the IPv6 address, which is corresponding to the host name registered in the filter table, to the source's IPv6 address of the received packet. Then, the control proceeds to step S18.

Figure 13:
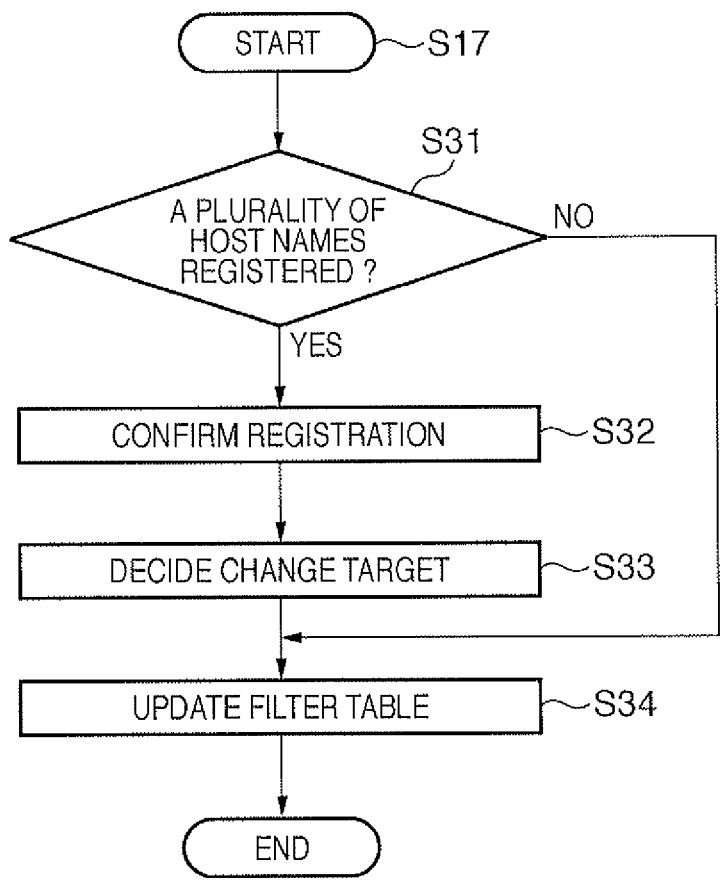
FIG. 13 is a flowchart describing details of the control in step S17 in FIG. 11.

FIG. 13 is a flowchart describing details of the control in step S17 in FIG. 11.

In step S31, the CPU 2001 determines whether or not a plurality of host names acquired in step S16 are registered in the filter table. If a plurality of host names are registered in the filter table, the control proceeds to step S32 where all IPv6 addresses corresponding to the registered host name are acquired. In this case, the CPU 2001 makes a forward resolution request of AAAA record to the DNS server 103, thereby acquiring all IPv6 addresses corresponding to the host name. In step S33, a registered item in the filter table targeted to change is determined. More specifically, the CPU 2001 compares the IPv6 address corresponding to the host name, which is registered in the filter table, with the IPv6 address acquired in step S32. Among the IPv6 addresses registered in the filter table, an IPv6 address which is not registered in the DNS server 103 and is corresponding to the host name acquired in step S16 is decided to be the change target. In step S34, the IPv6 address of the filter table registration target is changed to the value of the source's IPv6 address of the received packet.

The series of control in FIG. 13 takes into consideration of the characteristic that a plurality of IPv6 addresses can be allocated to one node or one network interface. In this case, the filter table may include a plurality of IPv6 addresses corresponding to the same Mac address. Therefore, in order to identify a changed address value among the plurality of IPv6 addresses, a match between the host name and IPv6 address is confirmed, then an IPv6 address which is not currently registered in the DNS server 103 is determined to be the changed address.

Referring back to FIG. 11, in step S18, the CPU 2001 executes IPv6 filtering control. The CPU 2001 determines whether or not the source's IPv6 address of the received packet is registered in the filter table, and if it is determined that is registered, the CPU 2001 discards the received packet. Meanwhile, if the address is not registered, the received packet is not discarded. Next, in step S19, data of the received packet is transferred to an application program of the upper layer through a socket API. The application program of the upper layer receives the data and performs predetermined processing.

Besides the occasion of packet reception, the MFP 101 is performing filter table update. The MFP 101 periodically determines whether or not there is any change in the IPv6 addresses corresponding to the MAC addresses and host names registered in the filter table, and if a change is found, the MFP 101 updates the filter table. This control is performed by, as described above with reference to FIG. 11, using a neighbor discovery message according to the ICMPv6 and accessing the DNS server 103.

As has been described above, according to the image forming apparatus of the first embodiment, a MAC address of the packet received through the network, a network address of the packet in the network layer in which the packet is received, and a host name of the transmission device which has transmitted the packet are detected. If the detected address or host name is registered in the filter table, control is performed to restrict (reject) processing of the packet. Furthermore, the information in the filter table is confirmed by the DNS server or the like through a network and updated to the latest information.

By virtue of the above features, it is no longer necessary for a user to frequently update contents of a filter table for filtering a network address.

Furthermore, execution of a reception data filtering control can be assured even in an environment where there is a node using an IPv6 anonymous address, or an environment where a network address of a node is changed in a short period of time, for example, a case where an IP address is distributed by a DHCP.

Moreover, because a user no longer needs to update the filter table, it is possible to decrease a user's labor.

[Second Embodiment]

Next, a second embodiment of the present invention is described. The second embodiment describes a case where IPv4 communication is performed in the system environment shown in FIG. 1 and the MFP 101 performs IPv4 address filtering. Since configurations of the MFP 101 and system according to the second embodiment are similar to that of the first embodiment, descriptions thereof are omitted.

Figure 14:
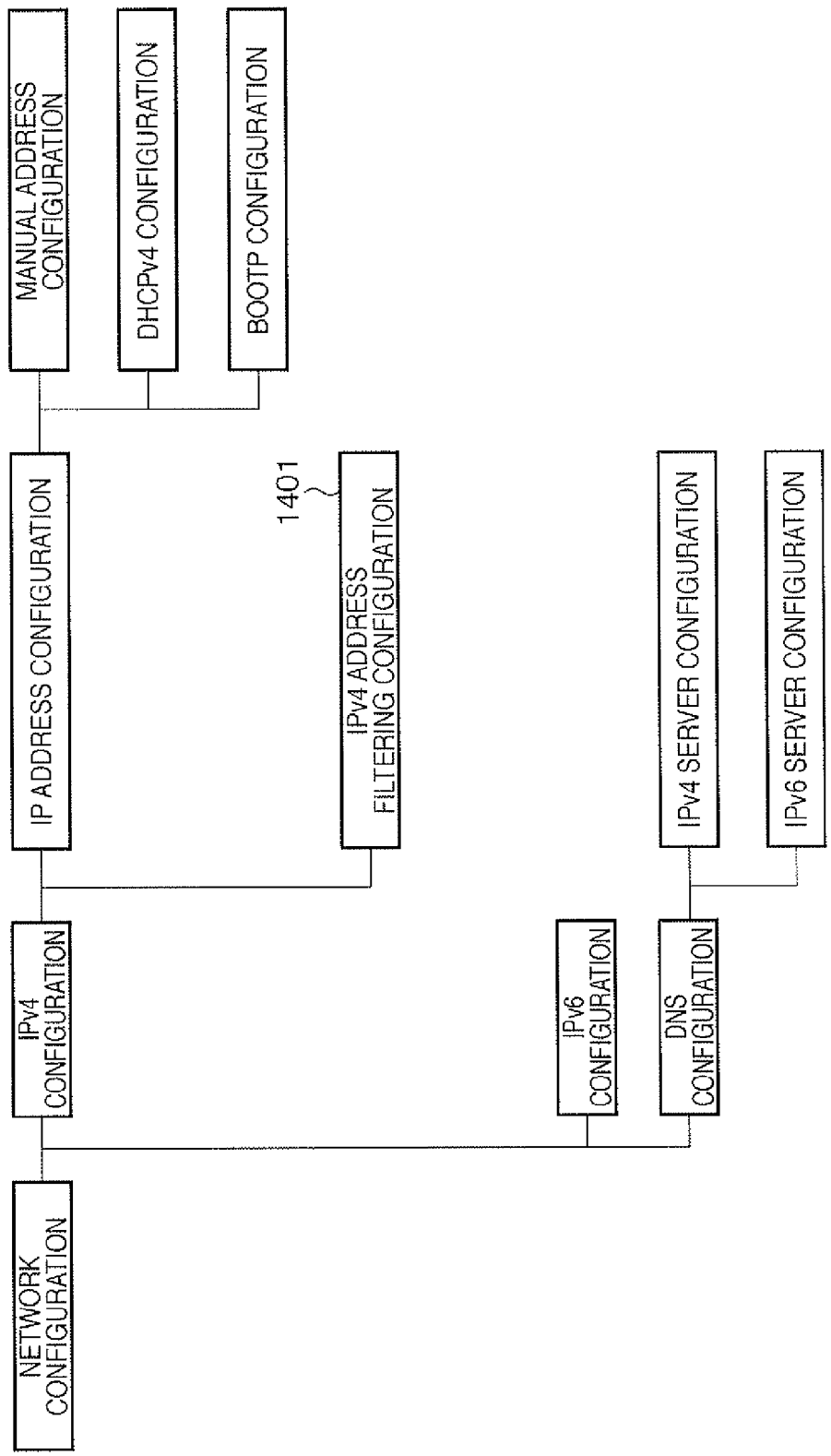
FIG. 14 is a diagram showing, as an example, a tree structure of a network configuration which is displayed on a display unit when a mode setting key of a console unit is depressed according to the second embodiment of the present invention.

FIG. 14 shows, as an example, a tree structure of a network configuration which is displayed on the display unit 2013 when the mode setting key 2019 of the console unit 2012 is depressed according to the second embodiment. The menu related to the network configuration has a tree structure. For instance, "IPv4 Address Filtering Configuration" 1401, which is a function for restricting processing of a packet transmitted from a particular IPv4 address, is positioned on a network layer as follows, that is, from the upper layer, "Network Configuration"-"IPv4 Configuration"-"IPv4 Address Filtering Configuration".

Figure 15:
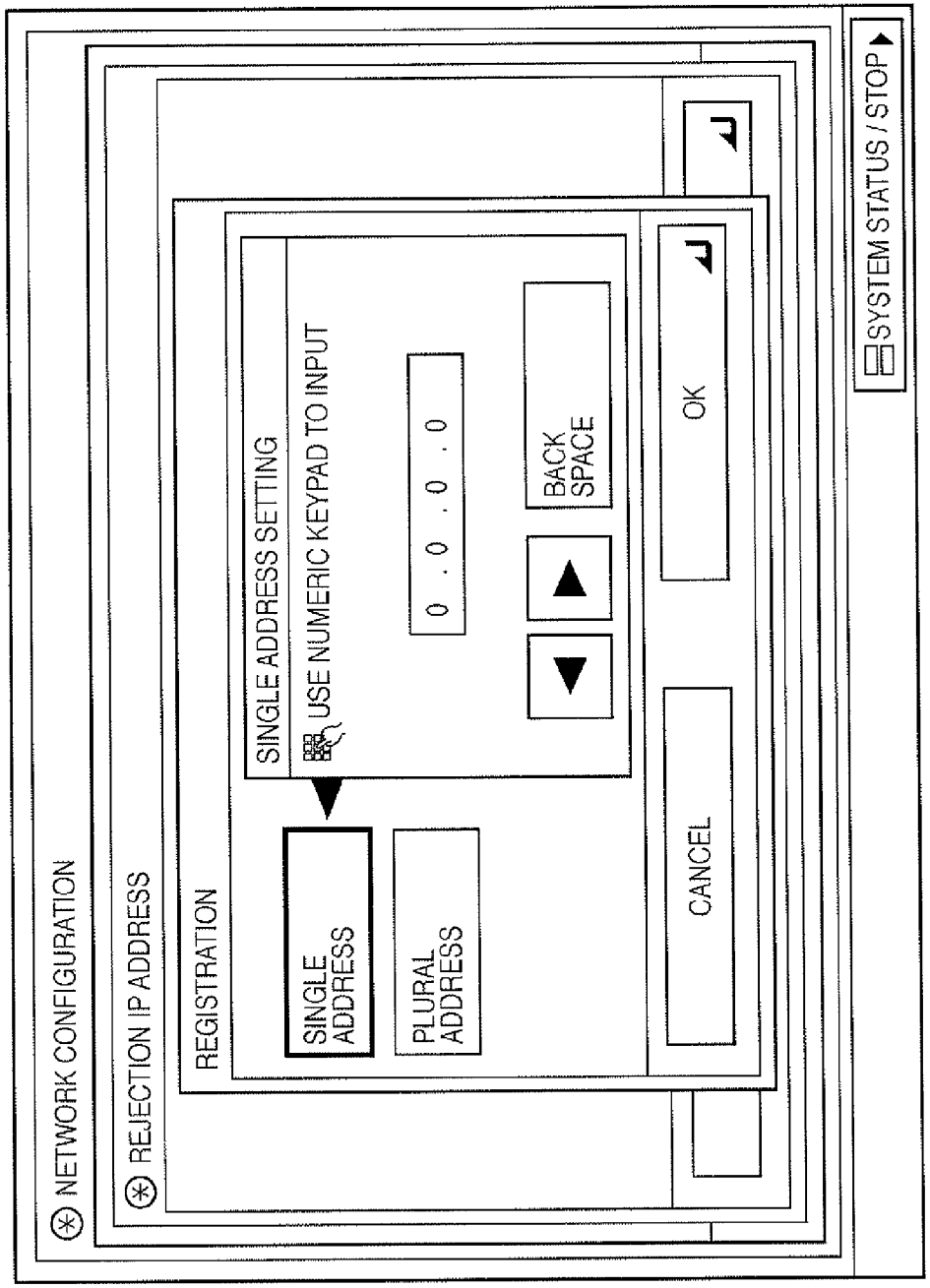
FIG. 15 depicts a view illustrating a display example when a "single address" is designated according to the second embodiment.

FIG. 15 depicts a view illustrating an example of a screen for setting the IPv4 address filtering configuration according to the second embodiment. An operator of the MFP 101 can input a single IPv4 address targeted to filtering, or can designate a range of IPv4 addresses.

FIG. 15 shows a display example when a "single address" is designated.

Figure 16:
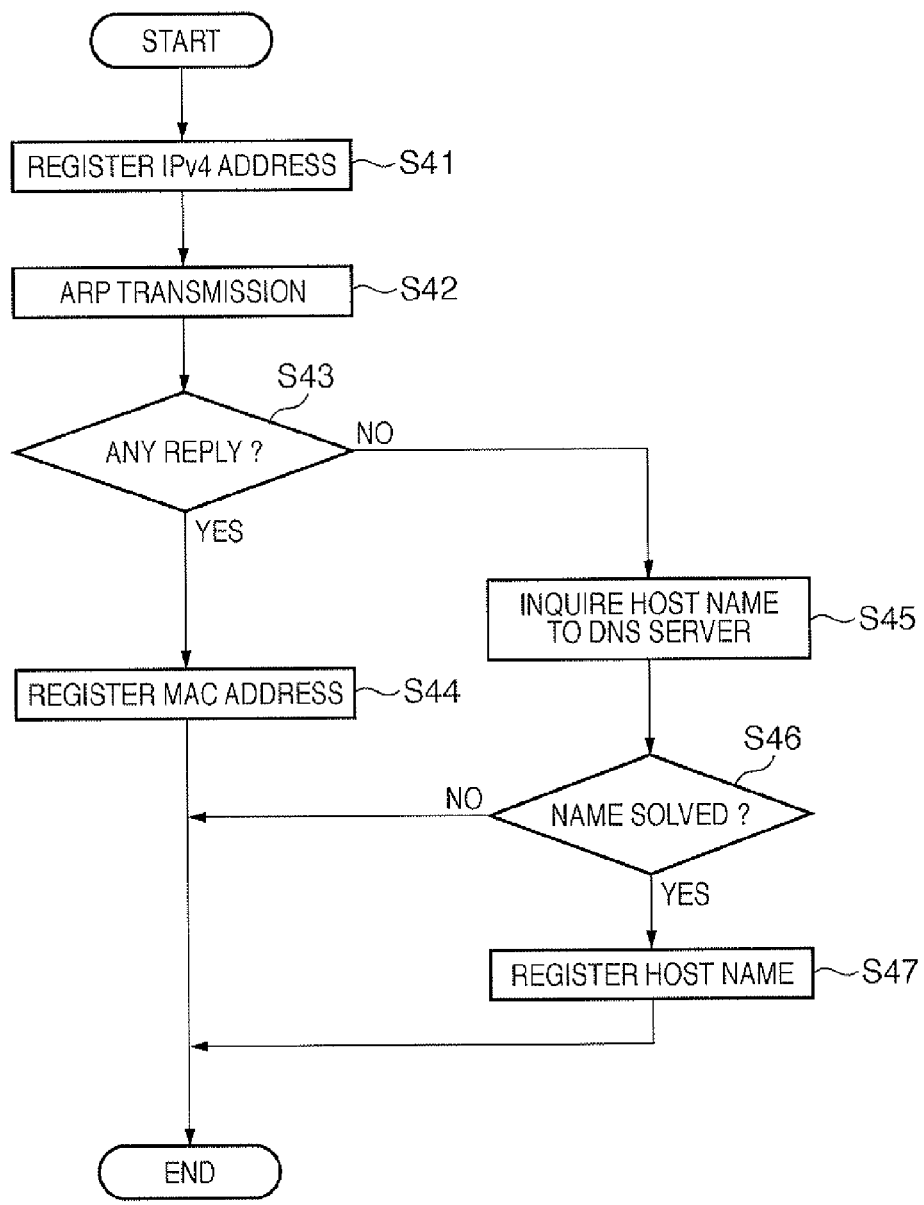
FIG. 16 is a flowchart describing a filter table registration sequence in a case where an IPv4 address which is targeted to IPv4 filtering is inputted according to the second embodiment.

FIG. 16 is a flowchart describing a filter table registration sequence in a case where an IPv4 address which is subjected to IPv4 filtering is inputted according to the second embodiment.

The filter table according to the second embodiment is a list of IPv4 addresses of which processing by the MFP 101 should be restricted, and stores a Mac address and a host name in pairs.

FIG. 17 depicts a view illustrating an example of the filter table according to the second embodiment.

The IPv4 address inputted by an operator of the MFP 101 is stored in the column 17001. Each MAC address of a node having an IPv4 address is stored in the column 17002 corresponding to the IPv4 address row.

Further, a host name of a node having the IPv4 address is stored in the column 17003 of the corresponding IPv4 address row. Similarly to the above-described first embodiment, a host name can be omitted here. In this case, the host name registration and search processing based on the host name can be omitted in the flowcharts shown in FIGS. 16 and 18.

Next, filter table registration control according to the second embodiment is described with reference to the flowchart in FIG. 16. A program executing this control is stored in the ROM 2003 and is executed under the control of the CPU 2001.

In step S41, when an operator of the MFP 101 inputs an IPv4 address, the IPv4 address is stored in the filter table. In step S42, a Mac address of the node having the inputted IPv4 address is confirmed. More specifically, the MFP 101 transmits an address resolution protocol (ARP) message to the LAN 105. If a node having the IPv4 address inputted by the operator exists on the LAN 105, the node sends back an ARP reply to the MFP 101 as a response. If an ARP reply is received in step S43, the control proceeds to step S44. If an ARP reply is not received in step S43, the control proceeds to step S45. In step S44, a Mac address of the node having the IPv4 address inputted by the operator is stored in the filter table. Here, the MFP 101 acquires a Mac address included in the APR reply and registers the Mac address in the column 17002 corresponding to the inputted IPv4 address.

If the APR reply is not received in step S43, the control proceeds to step S45 and a host name corresponding to the inputted IPv4 address is inquired to the DNS server 103.

Here, the CPU 2001 makes a reverse lookup request of A record to the DNS server 103, thereby acquiring a host name corresponding to the inputted IPv4 address. In step S46, if it is determined that a host name has been acquired as a result of the inquiry to the DNS server 103, the control proceeds to step S47 and the host name received from the DNS server 103 is registered in the filter table. More specifically, the CPU 2001 registers the host name in the filter table column 17002 corresponding to the inputted IPv4 address.

Meanwhile, if the host name acquisition fails in step S46, the table registration control is cancelled. Herein, the host name acquisition failure includes a case where an error code is returned from the DNS server 103, a case where communication with the DNS server 103 cannot be performed, or a case where registration of the DNS server 103 has not been completed in the MFP 101.

Figure 18:
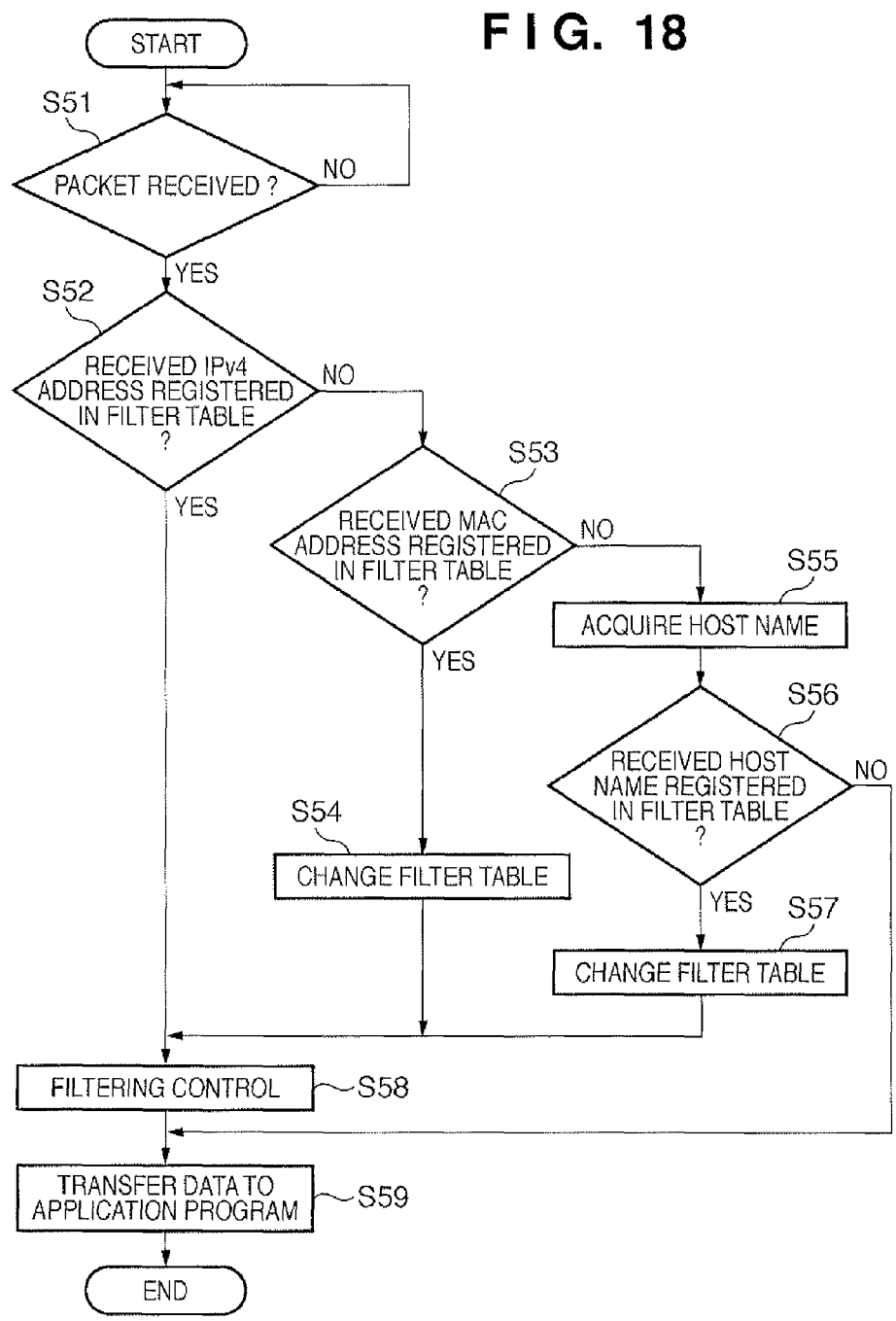
FIG. 18 is a flowchart describing a filtering control in a case where the MFP according to the second embodiment receives a packet.

FIG. 18 is a flowchart describing a filtering control in a case where the MFP 101 according to the second embodiment receives a packet.

In step S51, the MFP 101 waits for reception of an IPv4 packet. When an IPv4 packet is received, the control proceeds to step S52. In step S52, the CPU 2001 confirms a source's IPv4 address of the received packet, and determines whether or not the source's IPv4 address is registered in the filter table. If it is determined in step S52 that the source's IPv4 address is registered in the filter table, the control proceeds to step S58 where filtering control of discarding the packet is performed.

If it is determined in step S52 that the source's IPv4 address is not registered in the filter table, the control proceeds to step S53 to determine whether or not the source's Mac address of the received packet is registered in the filter table. If it is registered, the control proceeds to step S54 where the CPU 2001 changes the value of the IPv4 address, which is corresponding to the Mac address registered in the filter table, to the source's IPv4 address of the received packet. Then, the control proceeds to step S58 where filtering is executed. Note that this situation in which the source's Mac address is registered in the filter table signifies that the IPv4 address of the filtering target node has been changed after the IPv4 address was once registered as a filtering target in the MFP 101 by an operator.

Meanwhile, if it is determined in step S53 that the source's Mac address is not registered in the filter table, the control proceeds to step S55 where the host name of the received packet is acquired. The CPU 2001 makes a reverse lookup request of A record to the DNS server 103, thereby inquiring a host name corresponding to the source's IPv4 address of the received packet and acquiring it. In step S56, it is determined whether or not the host name acquired in step S55 is registered in the filter table. If the acquired host name is registered in the filter table, the control proceeds to step S57. Note that this situation in which the acquired host name is registered in the filter table signifies that the IPv4 address of the filtering target node has been changed after the IPv4 address was once registered as a filtering target in the MFP 101 by an operator. In step S57, the CPU 2001 changes the value of the IPv4 address, which is corresponding to the host name registered in the filter table, to the source's IPv4 address of the received packet. Then, the control proceeds to step S58 to execute filtering control. Meanwhile, if the acquired host name is registered in the filter table in step S56, the control proceeds to step S59.

In step S58, the CPU 2001 executes IPv4 filtering control. More specifically, it is determined whether or not the source's IPv4 address of the received packet is registered in the filter table, and if it is registered, the received packet is discarded. Meanwhile, if the address is not registered, the received packet is not discarded. Next, in step S59, data of the received packet is transferred to an application program of the upper layer through a socket API. The application program of the upper layer receives the data and performs predetermined processing.

Besides the occasion of packet reception, the MFP 101 is performing filter table update. The MFP 101 periodically determines whether or not there is any change in the IPv4 addresses corresponding to the MAC addresses and host names registered in the filter table, and if a change is found, the MFP 101 updates the filter table. This control is performed by, as described above with reference to FIG. 18, using an ARP message and accessing the DNS server 103.

As has been described above, according to the second embodiment, it is no longer necessary for a user to frequently change contents of a filter table for filtering a network address.

Furthermore, execution of a reception data filtering control can be assured even in an environment where there is a node using an IPv4 anonymous address, or an environment where a network address of a node is changed in a short period of time, for example, a case where an IP address is distributed by a DHCP.

Moreover, because a user no longer needs to update the filter table, it is possible to decrease a user's labor.

[Other Embodiment]

Although the above-described embodiments perform filtering control to restrict (prohibit) processing of a packet transmitted from an apparatus that is registered in a filter table, it is also possible to configure an embodiment so as to process only a packet that is transmitted from a registered apparatus. In other words, filtering control may be executed by registering, in a filtering table, an apparatus to which packet processing is to be permitted.

Note that the present invention can also be achieved by directly or remotely providing a computer system or apparatus with a software program realizing the above-described functions of the embodiments, reading the program by a computer of the system or apparatus, and executing the program. In this case, as long as the program function is achieved, the form of embodiment is not limited to a program.

Therefore, the program codes which are installed in the computer in order to realize the functions of the present invention also constitute the invention. In other words, claims of the present invention include the computer program that realizes the functions of the present invention. In this case, as long as the program function is achieved, the form of program may be of object codes, a program executed by an interpreter, script data supplied to an OS, or the like.

Various recording media may be used for supplying the program. For instance, a floppy (registered trademark) disk, a hard disk, an optical disk, a magneto-optical disk, MO, CD-ROM, CD-R, CD-RW, a magnetic tape, a non-volatile memory card, ROM, DVD (DVD-ROM, DVD-R) and the like can be used.

As another program supplying method, a home page on the Internet is accessed using a browser of a client computer, and the program may be downloaded from the homepage to a recording medium such as a hard disk. In this case, the downloaded program may be the computer program itself according to the present invention, or a compressed file including an automatic installation function. Alternatively, the program codes constituting the program according to the present invention may be divided into plural files, and each of the plural files may be downloaded from different home pages. In other words, the claims of the present invention also include a WWW server which allows plural users to download the program file that realizes the functions of the present invention using a computer.

Furthermore, the program according to the present invention may be encrypted and stored in a storage medium, for example, CD-ROM, for user distribution. In this case, a user who satisfies a predetermined condition is allowed to download decryption key data from a homepage on the Internet and use the key data to install the encrypted program in an executable form in a computer.

Still further, the present invention can also be achieved by an embodiment other than the above-described embodiments where aforesaid functions of the embodiments are realized by executing the program read by a computer. For instance, the functions according to the above embodiments can be realized by an OS (operating system) or the like working on a computer that performs part or the entire processes in accordance with designations of the program.

Furthermore, the program read from the recording medium may be written in a function expansion card which is inserted into the computer or in a memory provided in a function expansion unit which is connected to the computer. In this case, after the program is written in the function expansion card or unit, a CPU or the like contained in the function expansion card or unit performs part or the entire processes in accordance with designations of the program, thereby realizing the functions according to the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-171222, filed Jun. 28, 2007, which is hereby incorporated by reference herein in its entirety.

The invention claimed is:

1. A communication apparatus for performing a filtering process that discards a received packet, comprising:
    a storage unit that stores a filter table for specifying a packet for which the filtering process is to be performed, wherein the filter table registers a pair of an IP address designated by a user and a MAC address associated with the IP address;
    a discarding unit configured to discard a received packet in a case that an IP address of a transmission source of the received packet is registered in the filter table or in a case that a MAC address of the transmission source of the received packet is registered in the filter table; and
    a changing unit configured to change an IP address, among a plurality of IP addresses registered in the filter table, corresponding to the MAC address of the transmission source of the received packet into the IP address of the transmission source of the received packet, in a case that the IP address of the transmission source of the received packet is not registered in the filter table and the MAC address of the transmission source of the received is registered in the filter table,
    wherein the discarding unit and the changing unit are implemented by a processor and a memory.

2. The communication apparatus according to claim 1, wherein the IP address is an IPv4 address.

3. The communication apparatus according to claim 1, wherein the IP address is an IPv6 address.

4. A computer-implemented method of controlling a communication apparatus for performing a filtering process that discards a received packet, the method comprising:
a processor and a memory of the communication apparatus executing:
storing in a storage unit a filter table for specifying a packet for which the filtering process is to be performed, wherein the filter table registers a pair of an IP address designated by a user and a MAC address associated with the IP address;
discarding a receive packet in a case that an IP address of a transmission source of the received packet is registered in the filter table or in a case that a MAC address of the transmission source of the received packet is registered in the filter table; and
changing an IP address, among a plurality of IP addresses registered in the filter table, corresponding to the MAC address of the transmission source of the received packet into the IP address of the transmission source of the received packet, in a case that the IP address of the transmission source of the received packet is not registered in the filter table and the MAC address of the transmission source of the received packet is registered in the filter table.

5. A non-transitory computer readable storage medium storing a program for causing a computer to act as a communication apparatus for performing a filtering process that discards a received packet, the program comprising:
storing in a storage unit a filter table for specifying a packet for which the filtering process is to be performed, wherein the filter table registers a pair of an IP address designated by a user and a MAC address associated with the IP address;
discarding a received packet in a case that an IP address of a transmission source of the received packet is registered in the filter table or in a case that a MAC address of the transmission source of the received packet is registered in the filter table; and
changing an IP address, among a plurality of IP addresses registered in the filter table, corresponding to the MAC address of the transmission source of the received packet into the IP address of the transmission source of the received packet, in a case that the IP address of the transmission source of the received packet is not registered in the filter table and the MAC address of the transmission source of the received packet is registered in the filter table.

6. The communication apparatus according to claim 1, wherein in a case that a plurality of IP addresses corresponding to the MAC address of the transmission source of the received packet are registered in the filter table, the changing unit confirms an existence of nodes respectively having the plurality of IP addresses and changes an IP address of a node whose existence is not confirmed into the IP address of the transmission source of the received packet.

7. The communication apparatus according to claim 1, further comprising:
a reception unit configured to receive an IP address to be registered in the filter table from a user; and
a specifying unit configured to specify a MAC address of a node having the IP address received by the reception unit,
wherein the IP address received by the reception unit and the MAC address specified by the specifying unit are registered in the filter table, and
wherein the reception unit and the specifying unit are implemented by the processor and the memory.

8. The communication apparatus according to claim 7, wherein the specifying unit searches a node having the IP address received by the reception unit to specify the node having the IP address.

9. The communication apparatus according to claim 1, wherein the communication apparatus is a printing apparatus for executing print processing.

* * * * *